United States Patent Office 2,926,206
Patented Feb. 23, 1960

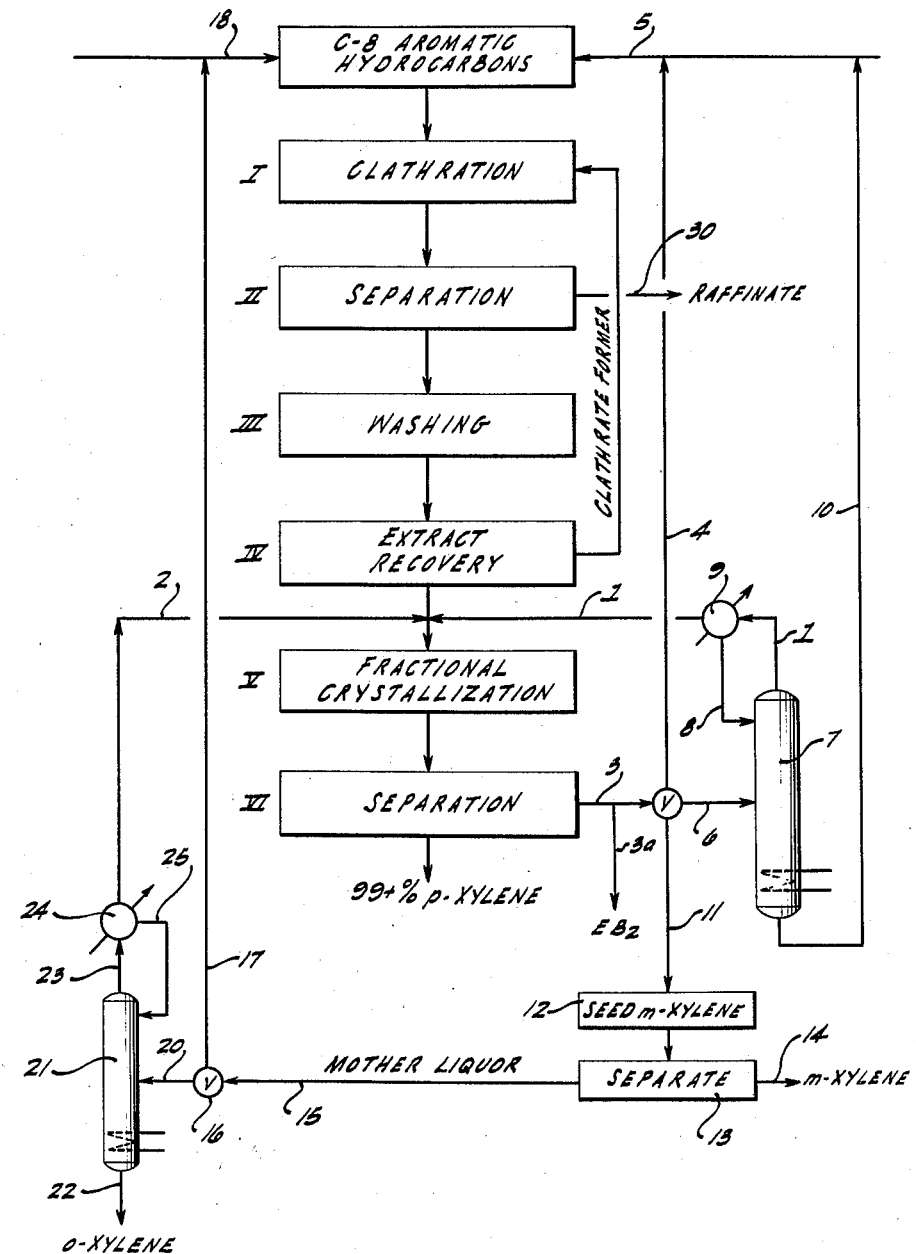

2,926,206

SEPARATION OF C-8 AROMATIC HYDROCARBON ISOMERS UTILIZING WERNER COMPLEXES

William D. Schaeffer, Pomona, and William Smith Dorsey, Fullerton, Calif., assignors to Union Oil Company of California, Los Angeles, Calif., a corporation of California Application February 24, 1958, Serial No. 717,264

8 Claims. (Cl. 260—674)

This invention relates to methods for separating mixtures of the C-8 aromatic hydrocarbon isomers, i.e. o-, m- and p-xylenes and ethylbenzene. It relates particularly to the recovery in good yields of substantially pure p-xylene from mixtures which also contain substantial proportions of ethylbenzene and at least one of the isomers, o-xylene or m-xylene. The method comprises essentially a two-stage process wherein p-xylene and ethylbenzene are selectively adsorbed or "clathrated" into a solid Werner complex in the first stage, and the adsorbed phase is recovered and further resolved fractional crystallization in a second stage to separate the p-xylene from the ethylbenzene. The invention also embraces certain highly advantageous recycle procedures for utilizing the mother liquor from the fractional crystallization step.

It is an object of this invention to provide economical methods for recovering p-xylene in high purity and yields from C-8 aromatic hydrocarbon mixtures.

A more specific object is to effect such separation by means of an optimum two-stage combination of clathration and fractional crystalilzation, whereby the most advantageous features of each step are utilized to a maximum degree.

These and other objects are achieved by the procedures more particularly described hereinafter.

In the reforming or hydroforming of naphthenic gasoline fractions, an aromatic reformate fraction may be obtained which boils between about 135°–145° C., and consists essentially of the C-8 aromatics in about the following proportions:

| | | |
|---|---|---|
| p-Xylene | 10–30% | (B.P. 138.5° C.). |
| m-Xylene | 35–65% | (B.P. 139.1° C.). |
| o-Xylene | 10–30% | (B.P. 144.4° C.). |
| Ethylbenzene | 5–30% | (B.P. 136.1° C.). |

The methods described herein are particularly adapted for the recovery of substantially pure p-xylene in high yields from such mixtures. The known methods for resolving these fractions are unsatisfactory from several standpoints. Fractional distillation may be feasible for separating o-xylene, or an ethylbenzene concentrate, but is ineffective for obtaining pure p-xylene due to the proximity of boiling points. Fractional crystallization is complicated by the formation of binary and ternary eutectics, so that even though p-xylene melts at 13.2° C. while o-xylene, m-xylene, and ethylebenzene melt at —29° C., —53.5° C., and —94° C. respectively, pure p-xylene may not be obtained from such mixtures except in low yields, generally amounting to no more than about 30–50%. Other separation methods have been proposed such as selective sulfonation, but such chemical methods are inherently cumbersome and expensive.

By the novel two-stage process herein described, we are able to recover at least about 75% of the p-xylene in such mixtures at purities of 98–100%. Taking a slight sacrifice in purity, we are able to recover 95% pure p-xylene in yields of 80–90%. To the best of our knowledge, no other two-stage process is presently capable of effecting separations of like efficiency.

The copending application of William D. Schaeffer, Serial No. 274,647, filed March 3, 1952, and now abandoned, of which this application is a continuation-in-part, describes certain methods whereby p-xylene, and to a lesser extent ethylbenzene, may be selectively absorebd or "clathrated" into certain Werner complexes composed of a metal salt and an organic nitrogen base, while m- and o-xylene are strongly rejected. By the methods described therein a p-xylene-ethylbenzene rich extract may be separated from mixtures which also contain m-xylene and o-xylene. Although the Werner comples employed are more selective for p-xylene than for ethylbenzene, it is found that the clathration reaction is essentially an equilibrium phenomenon and the clathrated phase, or extract, usually contains a ratio of p-xylene to ethylbenzene of about 2 to 5 times that of the feed mixture. Complete separation of p-xylene from ethylbenzene is therefore not economical by clathration alone, employing clathrate formers which have a substantial affinity for ethylbenzene, because a large number of stages would be required.

While ethylbenzene is not completely separable from p-xylene in the clathration step, those components may be separated almost quantitatively by fractional crystallization since there is more than 100° C. difference in melting points. Moreover, it has been found that ethlbenzene is highly desirable in a fractional crystallization stage wherein it is desired to crystallize p-xylene from a mixture containing also m-xylene, and at most a very minor proportion of o-xylene. Meta- and para-xylene form an eutectic at about —53° C. containing about 87% meta- and 13% para-xylene by weight. This eutectic will ordinarily begin to form before satisfatcory yields of pure p-xylene have crystallized. However, if the mixture contains at least as much ethylbenzene as m-xylene, and substantially more ethylbenzene than o-xylene, it may be supercooled to below —85° C. before any appreciable quantities of m-xylene crystallize. In this manner as much as 70–90 mole percent of the p-xylene may be crystallized in substantially pure form before the m-xylene begins to crystallize.

Ethylbenzene is therefore a desirable component in the mixture to be resolved by fractional crystallization, and may preferably be present in amounts ranging from about 18 to 50 mole percent. Ortho-xylene on the other hand is highly undesirable in the crystallization stage since it is the highest melting component next to p-xylene, and forms correspondingly high melting eutectics with the other ingredients. The process described herein is designed to provide suitably high ratios of ethylbenzene and low ratios of o-xylene in the crystallization stage, and at the same time to keep the ethylbenzene/p-xylene ratio in the feed mixture to the clathration step at a suitably low level, while recycling thereto mixtures which are most efficiently separated in that stage. The particular methods employed for achieving these aims may be more readily understood by referring to the accompanying drawing which is a flow sheet showing several specific modifications which may be employed.

The first step in the process, indicated at I in the drawing, is designated "clathration." This step involves essentially a contacting of the feed mixture to be separated with the particular Werner complex which is to be employed. This contacting may be performed by either of two general methods. The first consists in merely contacting and agitating a solid Werner complex with the liquid feed mixture. In this method, it may be desirable in some cases to dilute the feed mixture with a thinner which is not a solvent for the Werner complex in order to facilitate the agitation and handleability of the mixture. Hydrocarbon thinners are preferred for this purpose. In other cases the feed mixture may be sufficiently lean in the components to be absorbed in clathrate form that an extraneous thinner is unnecessary. In either case it is usually desirable that sufficient nonclathratable fluid be present to form a slurry which may be easily stirred, as with a propeller, or in a colloid mill. If no thinner is employed, the solid clathrate which is filtered or removed from the lean feed residue will contain an interstitial phase composed primarily of lean feed residue. If a thinner is employed, the interstitial phase will consist of thiner plus lean feed residue.

The second general method for performing the clathration step consists in dissolving a Werner complex in a solvent such as propylene glycol, methyl Cellosolve, or chloroform, adding the feed mixture, and then altering the physical environment of the whole mixture, as by cooling, in such manner as to precipitate the Werner complex. In precipitating, the complex selectively absorbs one or more components of the feed mixture, thereby forming a clathrate. As recovered by filtration or centrifuging, the clathrate contains an interstitial phase consisting of solvent plus lean feed mixture.

For purposes of this invention, it is preferred to conduct the clathration step under conditions designed to effect high recoveries of p-xylene and ethylbenzene, e.g. 80–90% recovery of p-xylene and 10–75% recovery of ethylbenzene. This objective may be achieved by using suitably high ratios of Werner complex, and/or by conducting the clathration at low temperatures to shift the equilibrium as far as possible toward clathrate formation as illustrated by the general equation:

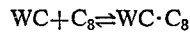

$$WC + C_8 \rightleftharpoons WC \cdot C_8$$

wherein WC indicates the Werner complex and $C_8$ represents p-xylene or ethylbenzene. Temperature of about —20° to 70° C. may be employed, and preferably between about 0° and 50° C. Sufficient Werner complex should be employed to provide at least about 0.5 mole, and preferably between about 1 mole and 3 moles thereof per mole of p-xylene in the feed.

The separation step II may be performed in any suitable manner, as by filtration, centrifuging, decantation, or by liquid-liquid phase separation wherein the solid clathrate is either suspended or dissolved in one of the phases. In any case, the raffinate is taken off through line 30, and the solid clathrate is transferred to the washing step III.

The separated clathrate contains an absorbed phase, or extract, relatively rich in p-xylene and ethylbenzene. As indicated above, it also contains an interstitial phase composed of solvent, thinner, or lean feed residue. The washing step indicated at III is designed primarily for removing the interstitial phase. This step may be omitted in some cases, but to obtain maximum purity, i.e. to reduce the ortho- and meta-xylene content of the extract to a minimum, it is definitely preferable to remove the interestial phase before recovering the extract. The washing step III is intended to include broadly any method for removing the interstitial phase. Such methods include for example partial steam-stripping, vapor-stripping, or washing with a solvent which is more readily separable from the clathrated phase than was the original interstitial phase. Suitable solvents include for example paraffinic hydrocarbon fractions in the pentane to heptane range. Methods for performing the washing step are more particularly described in U.S. Patent No. 2,798,102.

The washed clathrate is then subjected to treatment for recovery of the clathrated phase, or "extract" in step IV. Several methods may be employed for recovering the extract. One method consists of steam or vapor-stripping, which method is also described in considerable detail in the above U.S. Patent No. 2,798,102. The extract may also be recovered by simply decomposing the Werner complex, as by treatment with acid. It is ordinarily preferable however to recover the complex in a form suitable for recycling to step I of the process. One such method consists in dissolving the clathrate in a solvent, preferably a high-boiling solvent such as ethylene glycol, diethylene glycol, methyl Cellosolve, butyl Cellosolve, propylene glycol, butylene glycol, glycerol ethers, etc. and then distilling the solution to recover the liberated xylenes. In this process the xylenes may be recovered in substantially pure form, or as an azeotrope with the solvent. After recovery of the hydrocarbons the solid complex is ordinarily recovered by cooling the solvent. In most cases additional feed mixture may be added before the complex is precipitated, thereby again forming a clathrate with the para-xylene and ethylbenzene. Any other suitable method for recovering the extract from the clathrate may be employed.

If the recovered extract contains sufficient ethylbenzene, relative to the o- and m-xylenes present, it may then be subjected directly to fractional crystallization, step V. Alternatively, it may be desirable to admix with the extract a recycle liquor from lines 1 or 2 which is relatively enriched in ethylbenzene and substantially free of o-xylene. This not only enriches the extract in ethylbenzene, but decreases its concentration of o-xylene. It is preferable that the total mixture subjected to fractional crystallization should contain at least about 18% ethylbenzene, less than about 5% o-xylene, and at least as much ethylbenzene as m-xylene. The ethylbenzene to m-xylene ratio may range for example between about 1 and 10 or even more.

The actual crystallization in step V is accomplished in any suitable manner, as for example in a conventional scraped-surface freezer. It is preferable to conduct the crystallization so as to recover between about 75–95% of the p-xylene in the extract feed mixture to that step. This ordinarily entails crystallization temperatures ranging from about —40° to —90° C. Under such conditions the p-xylene recovered is found to be substantially 99% pure after washing with a suitable recycle stream of pure p-xylene.

The separation step indicated at VI may be accomplished by filtration or centrifuging, or if a scraped-surface freezer is employed in step V, separation is accomplished simultaneously with freezing. The mother liquor recovered from the separation step is taken off through line 3 and may be disposed of in any suitable manner. The drawing illustrates several alternative procedures for handling the mother liquor, but the invention is not limited to such procedures.

*Alternate A.*—If the washing step III is exhaustive, it will be found that the extract recovered from step IV will contain very little o- and m-xylene, e.g. between about 0.5% and 10% m-xylene and 0–5% o-xylene. Under such conditions the mother liquor from the fractional crystallization step may be e.g. 80–90% ethylbenzene. It is preferable to remove this stream entirely from the process (line 3a), since it is unnecessary at step V, and would be detrimental in step I. The results obtainable by this procedure are illustrated by the following example.

EXAMPLE I

A feed mixture having the composition shown in table 1 is contacted at about 40° C. with the Werner complex prepared by adding four moles of 4-ethylpyridine to one mole of manganous dithiocyanate. This complex may be designated $[Mn(4\text{-ethyl-pyridine})_4(SCN)_2]$, and about 1.15 moles thereof are employed per mole of p-xylene in the feed. The clathrate is then exhaustively washed with pentane to remove the interstitial mother liquor, and the extract is recovered by steam stripping. The recovered extract is subjected to one stage of fractional crystallization at a minimum of −90° C. The results are as follows:

*Table 1*

|  | Pounds of— | | | | |
|---|---|---|---|---|---|
|  | p-xylene | m-xylene | o-xylene | Ethyl benzene | Total |
| Feed | 210 | 450 | 180 | 160 | 1,000 |
| Raffinate from step II | 36 | 420 | 155 | 120 | 741 |
| Extract from step IV | 160 | 2 |  | 1 | 30 | 193 |
| Crystals from step VI | 156 |  |  |  | 156 |
| Mother liquor from step VI | 4 | 2 | 1 | 30 | 37 |

This example shows that by thorough washing of the clathrate to remove the interstitial, p-xylene-lean phase, the o- and m-xylene content of the recovered extract is so low that a 74% yield of pure p-xylene may be obtained in one stage of fractional crystallization. The wash-liquor from step III may be treated for recovery of its xylene content e.g. by distillation, and the xylenes recycled to the clathration step, or otherwise utilized.

*Alternate B.*—According to this alternative, which is preferred under most conditions where the mother liquor contains substantial proportions of para-xylene and meta-xylene, the whole of the liquor in line 3 is simply recycled through line 4 to be admixed with incoming fresh feed mixture in line 5. This procedure has the advantage of requiring a minimum of equipment and operational expense. The mother liquor ordinarily contains a somewhat higher percentage of p-xylene than the original feed mixture, and also a considerably higher proportion of ethylbenzene. While the high ethylbenzene content reduces the efficiency of the clathration step per se, it is usually found that it is beneficial from the standpoint of over-all economics of the process. Thus, even though the mother liquor substantially increases the ethylbenzene content of the feed, thereby requiring the use of more pounds of Werner complex per pound of p-xylene recovered, the extract which is recovered from step IV will usually be found to contain sufficient ethylbenzene to meet the requirements for step V, thereby eliminating the need for ethylbenzene enrichment at this stage. This modification is ordinarily preferable for treating feed mixtures which contain relatively high percentages of ethylbenzene, e.g. over 15%. The following example illustrates the operational details and results which may be expected.

EXAMPLE II

A feed mixture having the composition shown below in Table 2 is contacted and agitated at about 25° C. with the Werner complex prepared by adding 4 moles of gamma picoline to 1 mole of nickel dithiocyanate, and which may be designated as $[Ni(\text{gamma picoline})_4(SCN)_2]$. The mole-ratio of Werner complex to p-xylene in the total feed to the clathration step is about 1.12. After separating the raffinate and thoroughly washing the clathrate with pentane, the extract is recovered and subjected to freezing at down to about −75° C. The total mother liquor from the freezing step is then recycled with the incoming feed. In a continuous process utilizing the above steps the following approximate materials-balance is obtained at equilibrium:

*Table 2*

|  | Pounds of— | | | | |
|---|---|---|---|---|---|
|  | p-xylene | m-xylene | o-xylene | Ethyl benzene | Total |
| Fresh feed | 210 | 450 | 180 | 160 | 1,000 |
| Recycle from step VI | 42 | 12 | 8 | 53 | 115 |
| Total feed | 252 | 462 | 188 | 213 | 1,115 |
| Raffinate from step II | 42 | 450 | 180 | 160 | 832 |
| Extract from step IV | 210 | 12 | 8 | 53 | 282 |
| Crystals from step VI | 168 |  |  |  | 168 |
| Mother liquor from step VI | 42 | 12 | 8 | 53 | 115 |

This example shows a recovery of substantially 100% pure p-xylene amounting to about 80% of the p-xylene contained in the feed.

*Alternate C.*—In some cases it may be desirable to treat the mother liquor from step VI by distillation in order to obtain an ethylbenzene enriched overhead for recycle to the fractional crystallization step. This procedure has the advantage of increasing somewhat the efficiency of step I by reducing the amount of Werner complex required per pound of p-xylene recovered.

To operate according to this procedure at least a part of the mother liquor from line 3 is diverted through line 6 to distillation column 7. A fairly efficient column is required at this point in view of the proximity of boiling points of the components. For example if it is desired to recover an overhead containing 60%, and a bottoms containing 25% of ethylbenzene from a mother liquor containing about 35% ethylbenzene, a column containing from 70–80 trays may be employed and reflux ratios of about 20–25 are required. This reflux is cycled from condenser 9, via line 8, back to the top of column 7. The net overhead from column 7 is passed through line 1 to the fractional crystallization step V. The bottoms from distillation column 7 ordinarily will contain all the o-xylene, some ethylbenzene, and substantial amounts of p-xylene and m-xylene. It is ordinarily richer in p-xylene than the original feed mixture, and is hence advantageously recycled through line 10 to join the feed mixture in line 5. In some cases it may be found more economical to fractionate only part of the mother liquor in column 7, and recycle the remaining fraction directly through line 4 to feed line 5. In any event sufficient ethylbenzene-rich, o-xylene-lean overhead is produced to bring the extract from step IV to the desired composition for fractional crystallization.

EXAMPLE III

To illustrate the results obtainable by operation as described under Alternate C, an equilibrium materials-balance for a continuous process is given below in Table 3. The data submitted represents an operation employing about 1.0 mole of Werner complex per mole of p-xylene in the total feed to the clathration step, and wherein the fractional crystallization step is carried out at a minimum temperature of −70° C. The Werner complex employed is cobalt-tetra-(4-methylpyridine)-dithiocyanate prepared by adding four moles of 4-methylpyridine to an aqueous solution containing one mole of cobalt dithiocyanate. In the clathration step the dry complex is contacted and agitated at about 25° C. with the feed mixture in the presence of an excess of Skelly B thinner, and the extract is recovered from the clathrate by steam-stripping. The results at equilibrium are approximately as follows:

Table 3

|  | Pounds of— | | | | |
|---|---|---|---|---|---|
|  | p-xylene | m-xylene | o-xylene | Ethyl benzene | Total |
| Fresh feed | 185 | 500 | 192 | 123 | 1,000 |
| Recycle Bottoms from col. 7 | 46 | 46 | 14 | 36 | 142 |
| Total Feed | 231 | 546 | 206 | 159 | 1,142 |
| Raffinate from step II | 46 | 500 | 192 | 123 | 861 |
| Extract from step IV | 185 | 46 | 14 | 36 | 281 |
| Recycle O.H. from col. 7 | 9 | 13 |  | 37 | 59 |
| Total feed to cryst. step V | 194 | 59 | 14 | 73 | 340 |
| Crystals from step VI | 139 |  |  |  | 139 |
| Mother liquor from step VI | 55 | 59 | 14 | 73 | 201 |

This example shows a recovery of about 75% of substantially 100% pure p-xylene. Even better yields may be obtained by carrying the fractional crystallization down to as low as —85° to —90° C., at the expense of a slight decrease in purity.

*Alternate D.*—According to this procedure all or a part of the mother liquor in line 3 may be diverted through line 11 to an m-xylene crystallization stage indicated at 12. The mother liquor from step VI is ordinarily supercooled and the addition of m-xylene crystals at 12 causes the precipitation of an m-xylene-rich solid phase. For maximum purity, it may be desirable to heat the mother liquor up to about —60° to —70° C. to repress crystallization of o-xylene, thereby also slightly decreasing the yield of m-xylene recovered. The seeded mother liquor is then separated as by centrifuging at 13, the m-xylene-rich solid is taken off through line 14, and the mother liquor through line 15. This mother liquor may then be diverted wholly or in part through valve 16 to line 17 for recycle to incoming feed in line 18 if it is desired to build up the concentration of ethylbenzene in the feed mixture. The p-xylene content of the mother liquor in line 15 is ordinarily comparable to that of the original feed mixture. Alternatively, all or a part of the mother liquor in line 15 may be diverted through line 20 to distillation column 21, where an o-xylene-rich bottoms is removed through line 22 and an ethylbenzene-rich, o-xylene-lean overhead is removed through line 23. The overhead is condensed on condenser 24 and part of the condensate is recycled through line 25 to provide reflux for column 21. The net overhead is recycled through line 2 to build up the ethylbenzene concentration in the extract to step V. This alternative may be further illustrated by the following example showing the results which may be obtained by seeding the mother liquor shown in Table 3 above.

EXAMPLE IV

The mother liquor from step VI of Table 3 is seeded at about —65° C. with a small quantity of pure m-xylene crystals. The crystals formed are removed by filtration, and the composition of the second mother liquor and the solid phase is about as follows:

Table 4

|  | Pounds of— | | | | |
|---|---|---|---|---|---|
|  | p-xylene | m-xylene | o-xylene | Ethyl benzene | Total |
| Mother liquor from step VI | 55 | 59 | 14 | 73 | 201 |
| Crystals from separation 13 | 20 | 35 | 6 |  | 61 |
| Mother liquor from separation 13 | 35 | 24 | 8 | 73 | 140 |

The mother liquor from separation 13 is relatively enriched in p-xylene and ethylbenzene and hence may be recycled to the clathration step, or distilled to remove o-xylene and recycled to the crystallization stage.

It will be noted in all of the above examples that the final feed mixture which goes to the fractional crystallization step V contains (1) at least as much ethylbenzene as m-xylene, (2) substantially more ethylbenzene than o-xylene, and (3) more p-xylene than m-xylene. These characteristics are the principal determining factors in obtaining the advantageous separation of substantially pure para-xylene in high yields by low temperature, single-stage fractional crystallizations.

The above procedures illustrate some of the most advantageous combinations whereby the peculiar advantages of clathration and fractional crystallization may be attained, and the limitations of each step are obviated by devising an optimum interrelationship with the other step. Thus, the fractional crystallization step, being most efficient for separating p-xylene from ethylbenzene is utilized primarily for that purpose. The clathration step on the other hand is most efficient for separating p-xylene and ethylbenzene on the one hand and o- and m-xylene on the other hand, and the composition of the feed mixture to that stage is therefore adjusted so that the principal separation obtained is between p-xylene and m-xylene. Other particular combinations for achieving maximum efficiency will be apparent to those skilled in the art, especially when feed mixtures varying slightly from those shown are employed. The invention is intended to embrace all such variations and modifications as may be obvious to those skilled in the art.

While the above examples have illustrated only certain specific Werner complexes for carrying out the clathration step, other Werner complexes may be employed. The over-all requirement for the clathrate former is simply that it be a solid material which is capable of selectively absorbing p-xylene and ethylbenzene from mixtures containing in addition either m-xylene or o-xylene or both. The presently known substances which are most suitable for this purpose are the Werner complexes.

Specifically, the preferred Werner complexes comprise the dithiocyanates of nickel, cobalt, iron or manganese, coordinated with about four moles of a 4-lower alkyl pyridine, e.g. 4-methyl pyridine and/or 4-ethyl pyridine. Any of these complexes may be substituted in any of the above examples with approximately the same results. The only significant difference to be noted is that the manganous complexes appear to be slightly more selective for absorbing p-xylene in preference to ethylbenzene than the corresponding cobalt and nickel complexes.

This application is a continuation-in-part of application Serial No. 339,756, filed March 2, 1953, and now abandoned.

The foregoing disclosure of this invention is not to be considered as limiting since many variations may be made by those skilled in the art without departing from the scope or spirit of the following claims.

We claim:

1. A two-stage process for recovering substantially pure p-xylene in at least about 75% yield from a feed mixture made up essentially of C-8 aromatic hydrocarbons including about 10 to 30% p-xylene, 35 to 65% m-xylene, 0 to 30% o-xylene, and 5 to 30% ethylbenzene, which comprises contacting said mixture with a solid Werner complex, the temperature of said contacting and the amount of Werner complex employed being adjusted so as to form a solid clathrate containing about 80–90% of the p-xylene in said feed mixture, and wherein the clathrated hydrocarbon phase is predominantly p-xylene and ethylbenzene, and contains (1) at least as much ethylbenzene as m-xylene, and (2) substantially more ethylbenzene than o-xylene, then recovering said clathrated hydrocarbon phase and subjecting it to a single-stage fractional crystallization at a minimum temperature which is (1) between about −40° and −90° C. and (2) adjusted so as to crystallize out at least about 75% of the p-xylene contained therein, and recovering said p-xylene in at least about 95% purity from the residual mother liquor, said Werner complex being composed of one mole of a thiocyanate of a metal of atomic number 25–28 coordinated with about four moles of a 4-lower alkyl pyridine.

2. A process as defined in claim 1 wherein the alkyl group of said 4-lower alkyl pyridine contains 1–2 carbon atoms.

3. A process as defined in claim 2 wherein said metal is nickel.

4. A process as defined in claim 1 wherein said clathration step is carried out at a temperature between about 0° and 50° C., and wherein between about 0.5 and 3 moles of said Werner complex is employed per mole of p-xylene in the feed.

5. A process according to claim 1 wherein the major part of said mother liquor is recycled with fresh feed mixture to said contacting step with said Werner complex.

6. A process according to claim 1 including the steps of fractionally distilling said mother liquor to recover an overhead richer in ethylbenzene than said clathrated hydrocarbon phase, and recycling said overhead in admixture with the feed to said fractional crystallization step.

7. A process according to claim 1 including the steps of fractionally distilling said mother liquor to recover an overhead richer in ethylbenzene than said clathrated hydrocarbon phase, recycling said overhead in admixture with the feed to said fractional crystallization step, and recycling the bottoms from said fractional distillation to the initial contacting step with said Werner complex.

8. A process according to claim 1 including the steps of seeding said mother liquor with m-xylene to obtain a second mother liquor and an m-xylene-rich solid, and recycling said second mother liquor to the initial contacting step with said Werner complex.

References Cited in the file of this patent

UNITED STATES PATENTS

| | | |
|---|---|---|
| 2,511,711 | Hetzner | June 13, 1950 |
| 2,530,978 | Mason | Nov. 21, 1950 |
| 2,549,372 | Fetterly | Apr. 17, 1951 |
| 2,798,891 | Schaeffer | July 9, 1957 |
| 2,849,511 | Schaeffer et al. | Aug. 26, 1958 |